(12) United States Patent
Suzuki

(10) Patent No.: US 6,678,029 B2
(45) Date of Patent: Jan. 13, 2004

(54) LIQUID CRYSTAL CELL, DISPLAY DEVICE, AND METHOD OF FABRICATING LIQUID CRYSTAL CELL WITH SPECIAL FILL PORTS

(75) Inventor: Shunji Suzuki, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 09/907,087

(22) Filed: Jul. 17, 2001

(65) Prior Publication Data
US 2002/0012094 A1 Jan. 31, 2002

(30) Foreign Application Priority Data
Jul. 28, 2000 (JP) ........................................ 2000-228745

(51) Int. Cl.$^7$ ............................................ G02F 1/1339
(52) U.S. Cl. ........................................ 349/154; 349/189
(58) Field of Search ............................... 349/154, 189, 349/190

(56) References Cited

U.S. PATENT DOCUMENTS 5,037,185 A * 8/1991 Grupp ........................ 349/195
5,184,239 A * 2/1993 Sano et al. .................. 349/154
RE34,690 E * 8/1994 Carrington .................... 345/80
5,835,181 A * 11/1998 Nakamura et al. .......... 349/189
6,310,678 B1 * 10/2001 Shimotoyodome .......... 349/189

FOREIGN PATENT DOCUMENTS

JP 10186384 7/1998
JP 11231330 8/1999

* cited by examiner

Primary Examiner—Robert H. Kim
Assistant Examiner—Timothy L Rude
(74) Attorney, Agent, or Firm—Robert M. Trepp

(57) ABSTRACT

Bubbles mixed in liquid crystal injected into a liquid crystal cell are pushed out through an outlet. The outlet has a space secured to a maximum limit by an extended sealing portion reaching the outer peripheral end surfaces of substrates, and a step with a color filter is formed. The pushed-out bubbles are surely trapped by the space of the outlet. In a replenishing port for replenishing liquid crystal, an introduction spacer having a height equal to that of the color filter is provided, and by a capillary phenomenon, liquid crystal for replenishment can be smoothly introduced into the liquid crystal cell.

12 Claims, 13 Drawing Sheets (a)

(b)

(a)

(b)

LIQUID CRYSTAL CELL, DISPLAY DEVICE, AND METHOD OF FABRICATING LIQUID CRYSTAL CELL WITH SPECIAL FILL PORTS

BACKGROUND OF THE INVENTION

1. Technical Field

The present invention relates to a liquid crystal cell, a display device, and a method of fabricating a liquid crystal cell suitably used for injecting liquid crystal into a cell.

2. Discussion of Related Art

There has been a remarkable progress in the popularization of a liquid crystal display device used as an image display device for a personal computer, or other various monitors. The liquid crystal display device of this kind is typically constructed in a manner that a backlight as a sheet light source for illumination is provided in the backside of a liquid crystal cell and, by irradiating a liquid crystal surface having a predetermined expanse to an entirely uniform brightness, an image formed in the liquid crystal surface of the liquid crystal cell is made visible.

Such a liquid crystal cell includes signal and gate lines and the like, a thin film transistor (TFT) having an amorphous silicon layer or the like deposited thereon, a color filter, and so on, which are laminated between two glass substrates.

In fabricating the liquid crystal cell, a substrate having a TFT formed thereon and a substrate having a color filter formed thereon are opposed to each other in a separated state with a predetermined gap, and these two substrates are stuck together by a sealant coated around the opposing surfaces of the substrates. Since a so-called empty cell is formed by sticking together the two substrates in this manner, liquid crystal is injected into this empty cell.

At present, a vacuum injecting method is frequently used to inject liquid crystal into the empty cell. According to this vacuum injecting method, the empty cell is dipped in liquid crystal stored in a vessel in a chamber where a pressure is reduced to a level near a vacuum state. Then, by restoring the pressure inside the chamber to an atmospheric pressure increasedly, the liquid crystal is injected into the empty cell through an inlet formed in the empty cell.

However, even when the liquid crystal is injected by such a conventional method as described above, the injected liquid crystal may involve air to leave bubbles therein in the case where an injection condition is not proper, or there is a shortage of exhaustion or leaving time for the injection in the vacuum injecting method. This situation may cause display failures in the display region of the liquid crystal cell.

To eliminate such bubbles left behind, technologies have been already proposed, as described in the gazettes of Japanese Patent Laid-Open No. Hei 10 (1998)-186384, Japanese Patent Laid-Open No. Hei 11 (1999)-231330, and so on. According to these technologies, bubbles mixed in liquid crystal are pushed out by using a pressure roller to apply pressure to the liquid crystal cell having liquid crystal injected thereto. Even by these technologies, however, the complete removal of bubbles cannot be assured. Therefore, needless to say, there is a demand for the development of technology, which makes it possible to conduct a more efficient and sure process for removing bubbles.

In addition, when the bubbles are pushed out by applying pressure with the pressure roller, a shortage may occur in liquid crystal injected into the liquid crystal cell. However, no measures have been proposed to deal with such a case of shortage so far. This point on the shortage must be taken into consideration for actually conducting pushing-out of bubbles by applying pressure with the pressure roller.

Other problems with regard to the injection of liquid crystal into the empty cell are as follows.

That is, in the foregoing vacuum injecting method, so-called a batch process is carried out, which executes liquid crystal injection by simultaneously inserting a plurality of empty cells into the chamber. In such a batch process, a flow of process is temporarily stopped during reducing pressure (evacuation) inside the chamber and dipping in liquid crystal. Particularly, a capacity of the chamber housing the plurality of empty cells becomes inevitably increased, and it takes a long time, for example, 12 hours or more, to reduce pressure to the predetermined degree of vacuum inside the chamber. These problems interfere with an increase of production efficiency.

In addition, in the vacuum injecting method, as described above, the empty cell is dipped in the liquid crystal in the chamber set in nearly a vacuum state, and then ambient pressure inside the chamber is restored to an atmospheric pressure. Consequently, a large pressure difference occurs between the outside and the inside of the empty cell. In the case where a substrate constituting the empty cell is a plastic substrate, such a pressure difference causes substrate deformation or the like. Thus, under the present conditions, only a glass substrate can be used for the liquid crystal cell fabricated by the vacuum injecting method.

Besides the vacuum injecting method involving the foregoing problems, a so-called dropping method is presented. According to the dropping method, liquid crystal is dropped on one substrate coated with a sealant, and then this substrate is stuck with the other substrate for forming a liquid crystal cell. Even in the dropping method, however, a technology must also be provided to remove bubbles efficiently and surely, and to deal with the shortage of liquid crystal during the removal of the bubbles, when the bubbles are mixed in liquid crystal.

SUMMARY OF THE INVENTION

The present invention was made to solve the foregoing technical problems, and the object of the present invention is to provide a liquid crystal cell capable of surely removing bubbles when the bubbles are mixed in liquid crystal injected, a display device, and a method of fabricating a liquid crystal cell.

In order to achieve the foregoing object, a liquid crystal cell of the present invention comprises first and second openings formed on side faces of the liquid crystal cell, which communicate with a space filled with liquid crystal. In the first opening, a gap thereof is larger than a gap between two substrates in a region surrounded by a sealing portion because of a step formed with the region surrounded by the sealing portion by, for example a color filter or the like. Here, the gap between two substrates in the region surrounded by the sealing portion means a gap between electrode surfaces of, for example, a color filter, a TFT, and so on, provided in the both substrates. Because of the first opening, when the bubbles mixed in the liquid crystal during fabricating are pushed out from the first opening, the bubbles remaining with the liquid crystal in the first opening can be prevented from returning to the region surrounded by the sealing portion by the step portion.

A gap of the second opening is substantially equal to the gap in the region surrounded by the sealing portion.

Accordingly, when liquid crystal is injected, the liquid crystal is supplied to the second opening, and then a capillary phenomenon (capillarity) causes the liquid crystal to enter the region surrounded by the sealing portion from the second opening. In this case, if the gap of the second opening is set larger than the gap in the region surrounded by the sealing portion, as in the case of the first opening, a step is generated between the second opening and the region surrounded by the sealing portion. This step interferes with smooth liquid crystal injection. On the other hand, by setting the gap of the second opening substantially equal to the gap in the region surrounded by the sealing portion as described above, the liquid crystal can be smoothly injected from the second opening. Such a second opening should preferably be used for replenishing liquid crystal after the bubbles are pushed out from the first opening during fabricating.

The first and second openings may be disposed in the faces of the liquid crystal cell adjacent to each other, or in a corner portion of the liquid crystal cell and in the middle portion of the side face in contact with the corner respectively so as to be separated from each other. The disposition of these first and second openings is decided not only to smoothly discharge bubbles or replenish liquid crystal in the case where a process of pushing-out bubbles is carried out during fabricating, but also to prevent interference with a mechanism of the device for discharging bubbles or replenishing liquid crystal.

A display device of the present invention comprises an outlet for discharging bubbles from liquid crystal in the liquid crystal cell, and a replenishing port bored in the side face of the liquid crystal cell for replenishing the liquid crystal cell with liquid crystal by using a capillary phenomenon are provided. The replenishing port may include an introduction portion formed to be continuous to a color filter, a surface thereof being positioned on the same plane as that of the color filter. In this case, by providing the introduction portion protruding to an outer side of the replenishing port, liquid crystal replenishment based on a capillary phenomenon can be carried out more efficiently. Note that the introduction portion can be made of a material identical to that of the color filter.

A liquid crystal cell of the present invention comprises an opening, wall portions formed on both sides of the opening to reach the outer peripheral end portion of a substrate from a sealing portion, and bubble trapping means. During fabricating, if bubbles are mixed in liquid crystal in a region surrounded by the sealing portion, the bubbles are pushed out to the opening, and then the bubbles enter the opening together with liquid crystal filled in the region surrounded by the sealing portion. Then, by the bubble trapping means provided in the opening, the bubbles mixed in the liquid crystal in the opening can be prevented from returning to the region surrounded by the sealing portion. In this case, as the bubble trapping means, the step portion can be formed in the opening. Alternatively, as the bubble trapping means, a recessed portion can be formed in a portion having the opening formed therein.

A method of fabricating a liquid crystal cell according to the present invention comprises: a first step of obtaining a liquid crystal cell having liquid crystal filled between two substrates; a second step of discharging bubbles mixed in the liquid crystal by pressing the liquid crystal cell; and a third step of replenishing the liquid crystal cell with liquid crystal by using a capillary phenomenon. Accordingly, even when discharging bubbles causes a shortage of liquid crystal in the liquid crystal cell, liquid crystal can be replenished by using the capillary phenomenon.

In the first step, the liquid crystal cell may be obtained by a so-called dropping method, in which liquid crystal is dropped onto one of the substrates coated with a sealant, and then the other substrate is superposed thereon.

The second step is carried out at a temperature in which a viscosity of liquid crystal is lower than the viscosity at a normal temperature, and the sealant is softer than the same at a normal temperature. Accordingly, pushing-out bubbles can be performed more efficiently.

Further, in the second step, if a gap between the two substrates is adjusted by pressing the substrates, then pushing-out bubbles and gap adjustment can be simultaneously carried out. Accordingly, work efficiency can be enhanced.

In the third step, if liquid crystal is replenished from a side in a conveying direction set for conveying the liquid crystal cell, it is possible to prevent a dispenser or the like for replenishing liquid crystal from interfering with a mechanical unit such as a roller or the like for pushing-out bubbles.

BRIEF DESCRIPTION OF THE DRAWINGS

For a more complete understanding of the present invention and the advantages thereof, reference is now made to the following description taken in conjunction with the accompanying drawings.

FIG. 4(a) is a side view; FIG. 4(b) is a sectional view taken along a line A—A of FIG. 4(a); and FIG. 4(c) is a sectional view taken along a line B—B of FIG. 4(a).

FIG. 5(a) is a front view; FIG. 5(b) is a sectional view taken along a line C—C of FIG. 5(a); and FIG. 5(c) is a sectional view taken along a line D—D of FIG. 5(a).

FIG. 6(a) is a sectional plan view of the liquid crystal cell; and FIG. 6(b) is an elevational view in section.

FIG. 7(a) is a sectional plan view of the liquid crystal cell; FIG. 7(b) is an elevational view.

FIG. 11(a) is a sectional plan view; and FIG. 11(b) is a sectional view taken along a line E—E of FIG. 11(a).

FIG. 12(a) is a sectional plan view; and FIG. 12(b) is a sectional view taken along a line F—F of FIG. 12(a).

DETAILED DESCRIPTION OF THE PREFERRED EMBODIMENT

Next, the present invention will be described in detail based on an embodiment shown in the accompanying drawings.

Figure 1:
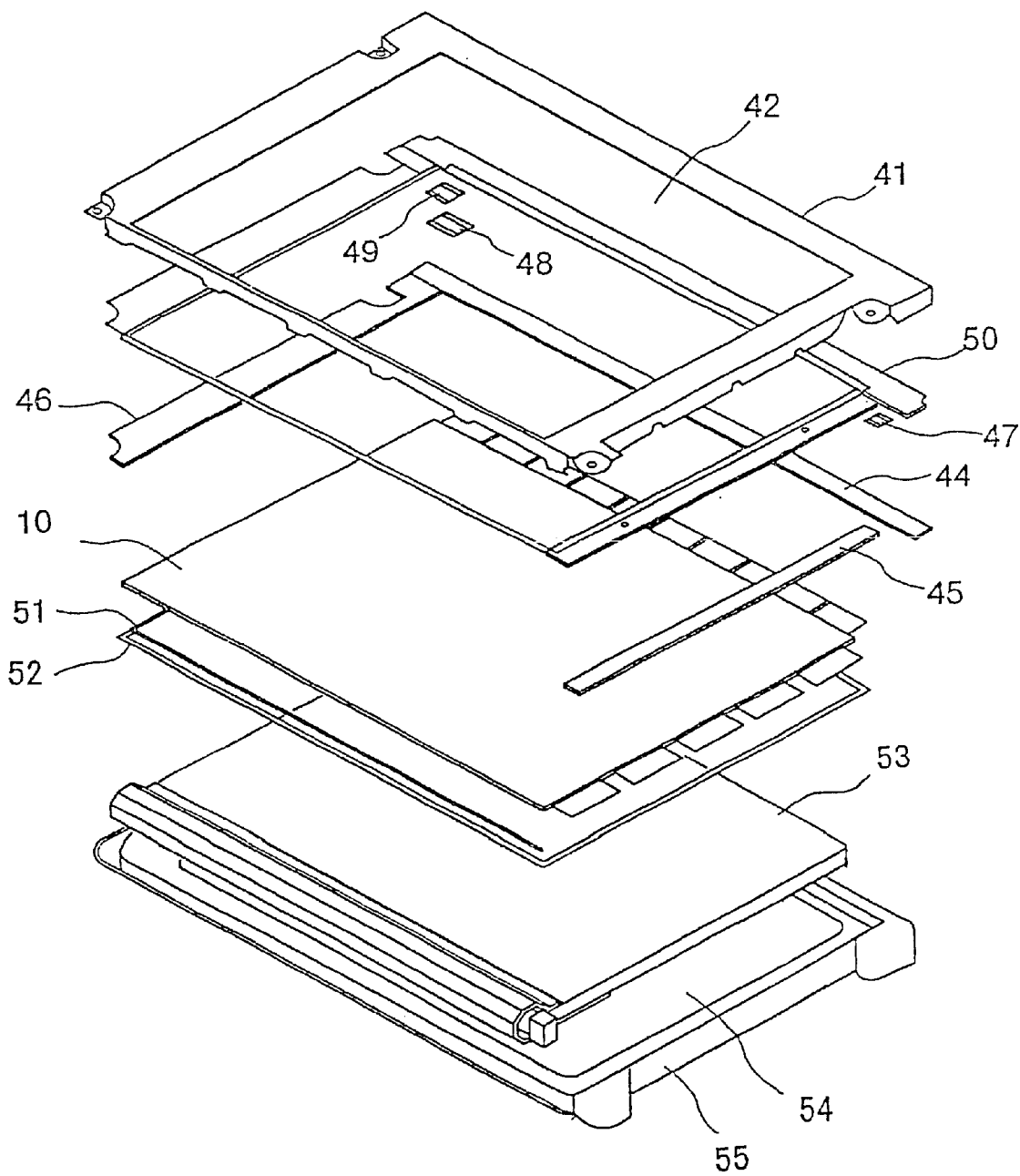
FIG. 1 is a view showing a constitution of a display device according to the described embodiment.

FIG. 1 is a perspective view for explaining an entire constitution of the display device according to an embodiment of the present invention. A reference numeral 41 denotes a metallic shield case for forming an upper frame, in which a display window 42 is formed to delimit a valid screen of a liquid crystal display module. A reference numeral 10 denotes a liquid crystal cell, comprising source and drain electrodes, a gate electrode, a TFT having an amorphous silicon layer or the like formed, a color filter, and so on, which are laminated between two glass substrates. Above the liquid crystal cell 10, a data driving circuit board 44, a gate driving circuit board 45, and an interface circuit board 46 are formed. Further, joiners 47, 48 and 49 are provided to connect these circuit boards. The circuit boards 44, 45 and 46 are fixed to the shield case 41 by interposing an insulating sheet 50.

On the other hand, below the liquid crystal cell 10, a light shielding spacer 52 is provided by interposing a rubber cushion 51, and a backlight unit 53 is provided to irradiate the liquid crystal cell 10 with a sheet light. Also, below the backlight unit 53, a lower case 55 having an opening 54 is provided.

Figure 2:
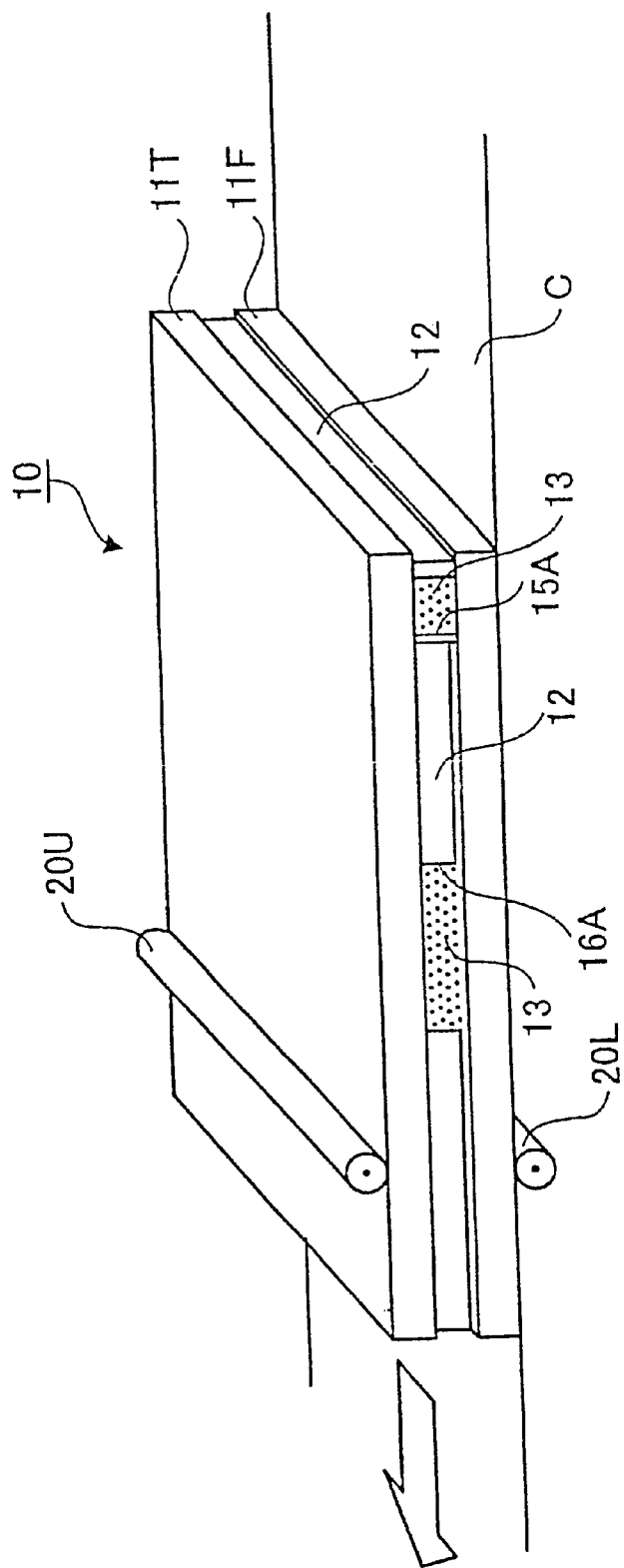
FIG. 2 is a view showing a liquid crystal cell of the described embodiment.

FIG. 2 is a view for explaining the liquid crystal cell 10 according to the described embodiment.

As shown in FIG. 2, the liquid crystal cell 10 constituting the display portion of the display device is formed to be, for example, substantially rectangular when seen from a plane, in such a manner that substrates 11T and 11F are opposed to each other separated by a predetermined gap, and stuck together by interpolating a sealing portion 12, and then a liquid crystal 13 is injected therein.

For each of the substrates 11T and 11F, a glass or plastic substrate is used. On the substrate 11T, signal and gate lines and the like, and a TFT (not shown) having an amorphous silicon layer or the like deposited are formed in the predetermined region of a surface opposing to the substrate 11F. On the substrate 11F, a color filter for dispersing a light irradiated from the backlight into three colors of R (Red), G (Green) and B (Blue) is provided in the region of a surface opposing to the substrate 11T and corresponding to the TFT.

Figure 3:
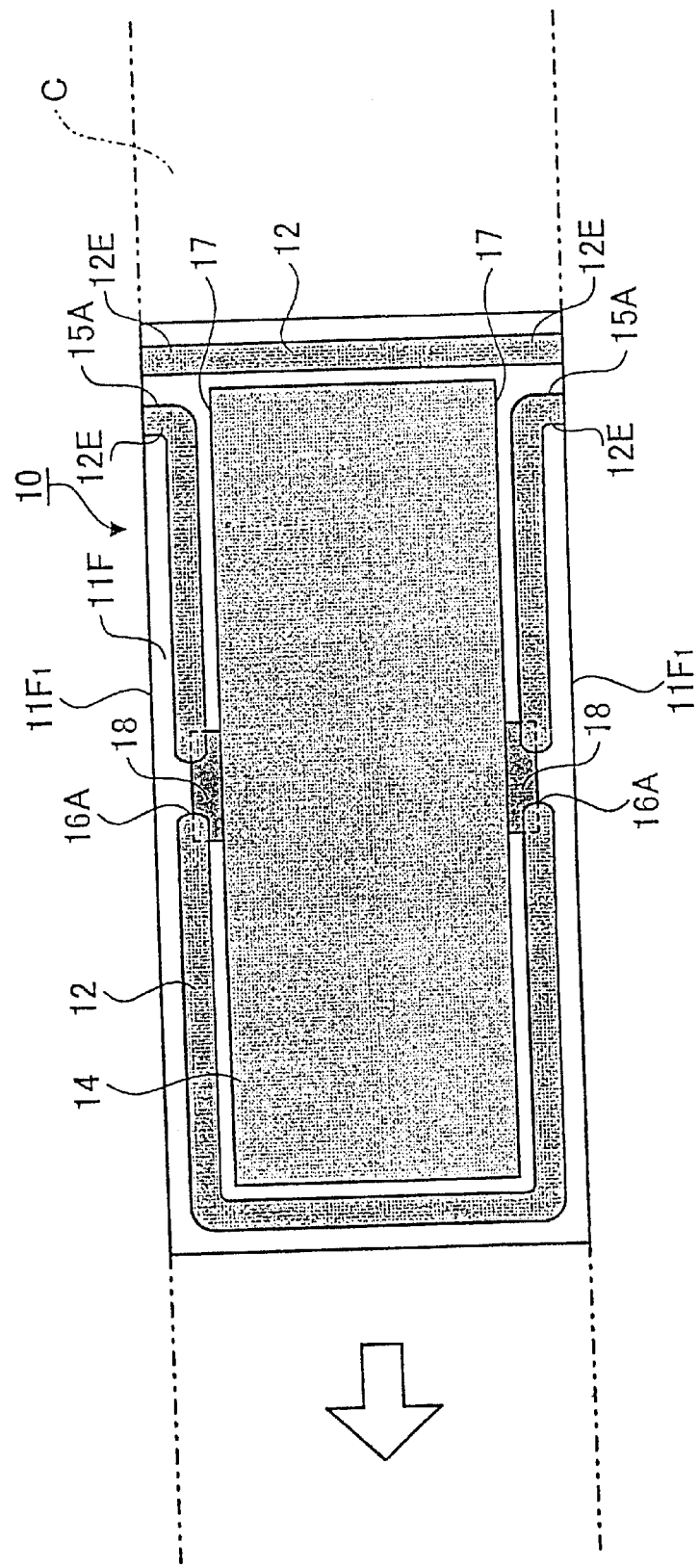
FIG. 3 is a sectional plan view of the liquid crystal cell.

FIG. 3 is a view of the liquid crystal cell 10 in a state where the liquid crystal cell 10 is sectionally viewed from a plane parallel to the sticking surfaces of the substrate 11T and 11F. In FIG. 3, a reference numeral 14 denotes the color filter.

As shown in FIG. 3, the sealing portion 12 is arranged, for example along the peripheral portion of the substrate 11F. More specifically, the sealing portion 12 is disposed to have a predetermined width, and to be positioned more within a predetermined dimension than the outer peripheral end surface $11F_1$ of the substrate 11F. For this sealing portion 12, for example a thermosetting resin, an ultraviolet-curing resin or the like is suitably used.

In addition, in the liquid crystal cell 10, on both faces of its longitudinal direction, an outlet 15A as a first opening and a replenishing port 16A as a second opening are formed for example in two places for each. In this case, in a liquid crystal injection step of the liquid crystal cell 10, when the liquid crystal cell 10 is conveyed by a conveyor C or the like in an arrow direction shown in FIG. 2 and FIG. 3, the outlet 15A and the replenishing port 16A are formed to be opened on the side faces with respect to the conveying direction of the liquid crystal cell 10. Then, the outlet 15A is disposed near the corner portion of the liquid crystal cell 10, and the replenishing port 16A is disposed on the middle portion of the side of the same, so as to be separated from each other.

The outlet 15A and the replenishing port 16A are formed to be open by cutting off places therefor without any coating of the sealing portion 12 thereon.

Figure 4:
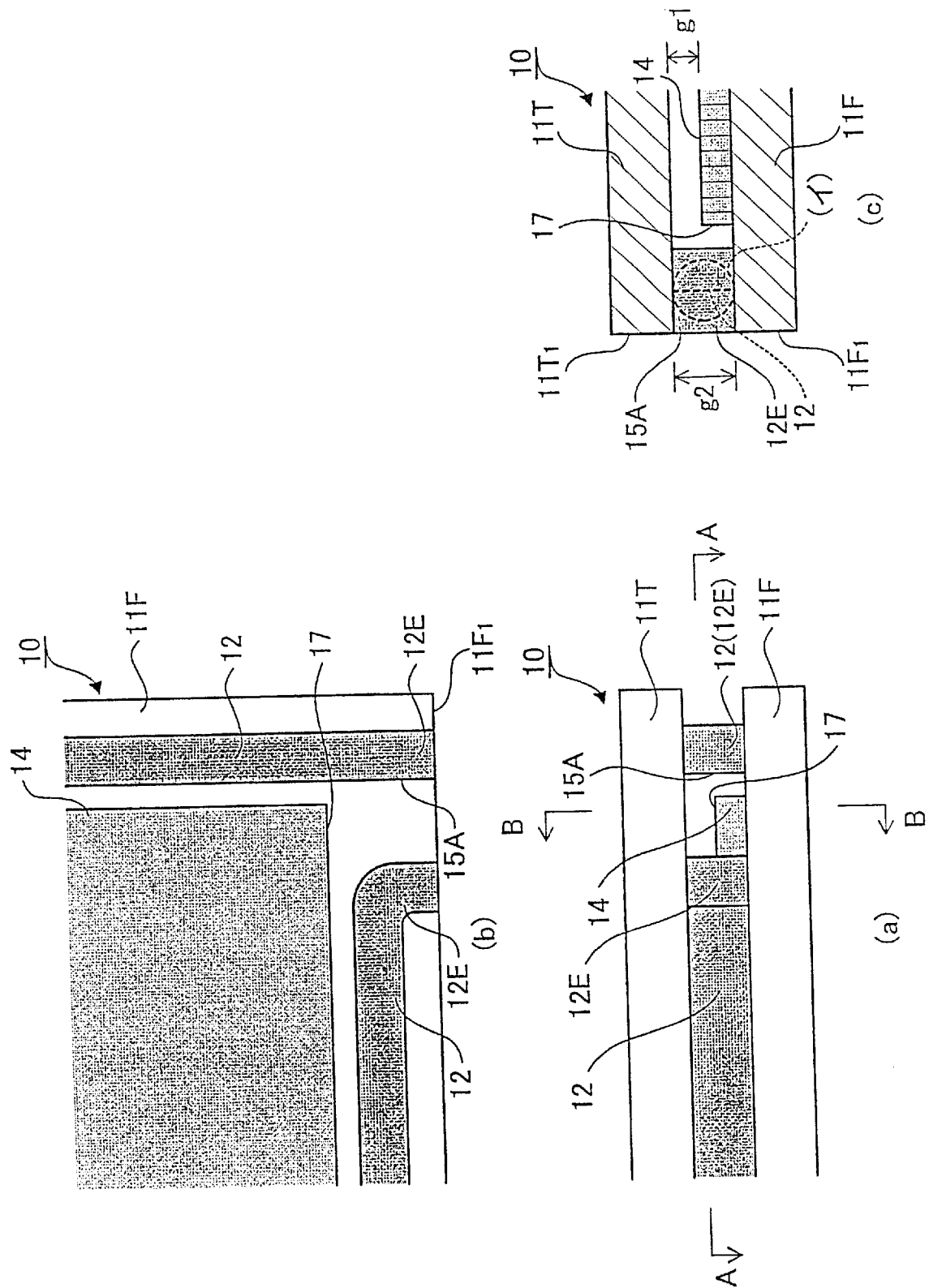
FIGS. 4(a) to 4(c) are views, each showing a structure of an outlet provided in the liquid crystal cell.

Each of FIGS. 4(a) to 4(c) is an enlarged view of a portion near the outlet 15A. Specifically, FIG. 4(a) is a side view; FIG. 4(b) is a sectional view taken along a line A—A of FIG. 4(a); and FIG. 4(c) is a sectional view taken along a line B—B of FIG. 4(a). As shown in the drawings, the outlet 15A is formed in such a manner that four sides thereof are surrounded by the sealing portions 12 on both sides thereof and the substrates 11T and 11F. In each of the sealing portions 12 on both sides of the outlet 15A, an extended sealing portion (wall portion) 12E is directed so as to be extended outward, and tip portions thereof are positioned substantially on the same planes of the outer peripheral end surfaces $11T_1$ and $11F_1$.

More inside than the sealing portion 12, the end portion of the color filer 14 is positioned. In this case, the color filter 14 has a thickness of, for example, 1 to 2 micrometer. Accordingly, in the portion of the outlet 15A, a step 17 is formed as bubble trapping means by the end portion of the color filter 14. In the region surrounded by the sealing portion 12, a gap g1 between the substrate 11T (electrode surface thereof) and the surface of the color filter 14 of the substrate 11F is set to, for example, 5 micrometer. Thus, a gap g2 between the substrate 11T and the substrate 11F in the portion of the outlet 15A outside more than the step 17 is set to, for example, 6 to 7 micrometer.

In this way, the outlet 15A has a space made by the extended sealing portions 12E on both sides to reach the outer peripheral end surfaces $11T_1$ and $11F_1$ of the substrates 11T and 11F. This space has the gap g2 larger than the gap g1 between the substrate 11T and the color filter 14 inside the liquid crystal cell 10 because of the presence of the step 17.

In the outlet 15A thus constituted, when bubbles mixed in the liquid crystal 13 are pushed out as described later, the pushed-out bubbles can be trapped in the space of the outlet 15A by the step 17 [for example, dotted line (x) in FIG. 4(c)], and the returning of the bubbles into the liquid crystal cell 10 can be prevented. In this case, if a diameter of each of the pushed-out bubbles is equal to or larger than the gap g1 (for example, 5 micrometer) between the substrate 11T and the color filter 14, then the bubbles can be surely trapped in the space by the step 17. In addition, even if a bubble diameter is equal to or smaller than the gap g1, the bubbles are caught by the step 17, and thereby the bubbles can be trapped in the space.

Figure 5:
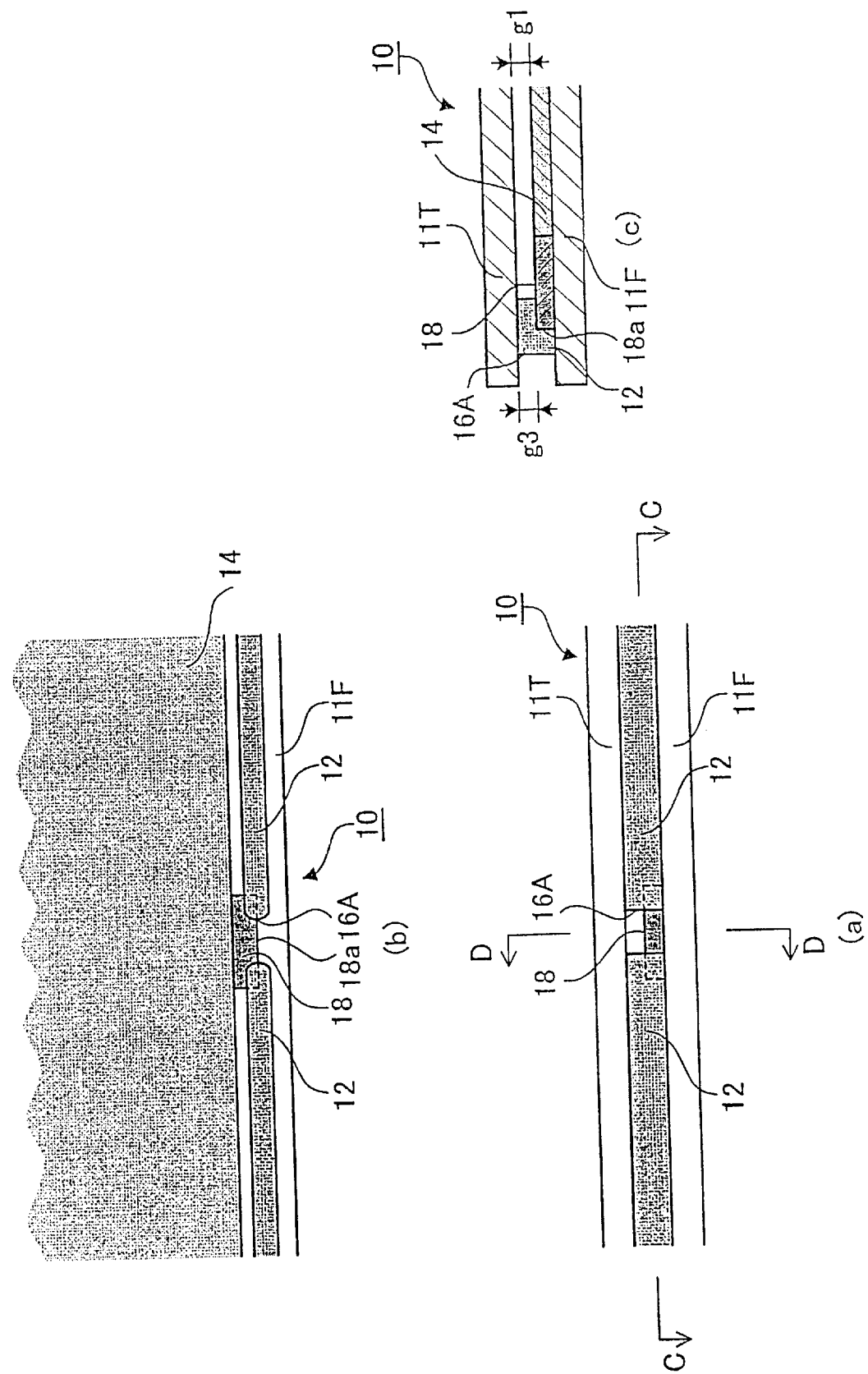
FIGS. 5(a) to 5(c) are views, each showing a structure of a replenishing port.
Figure 6:
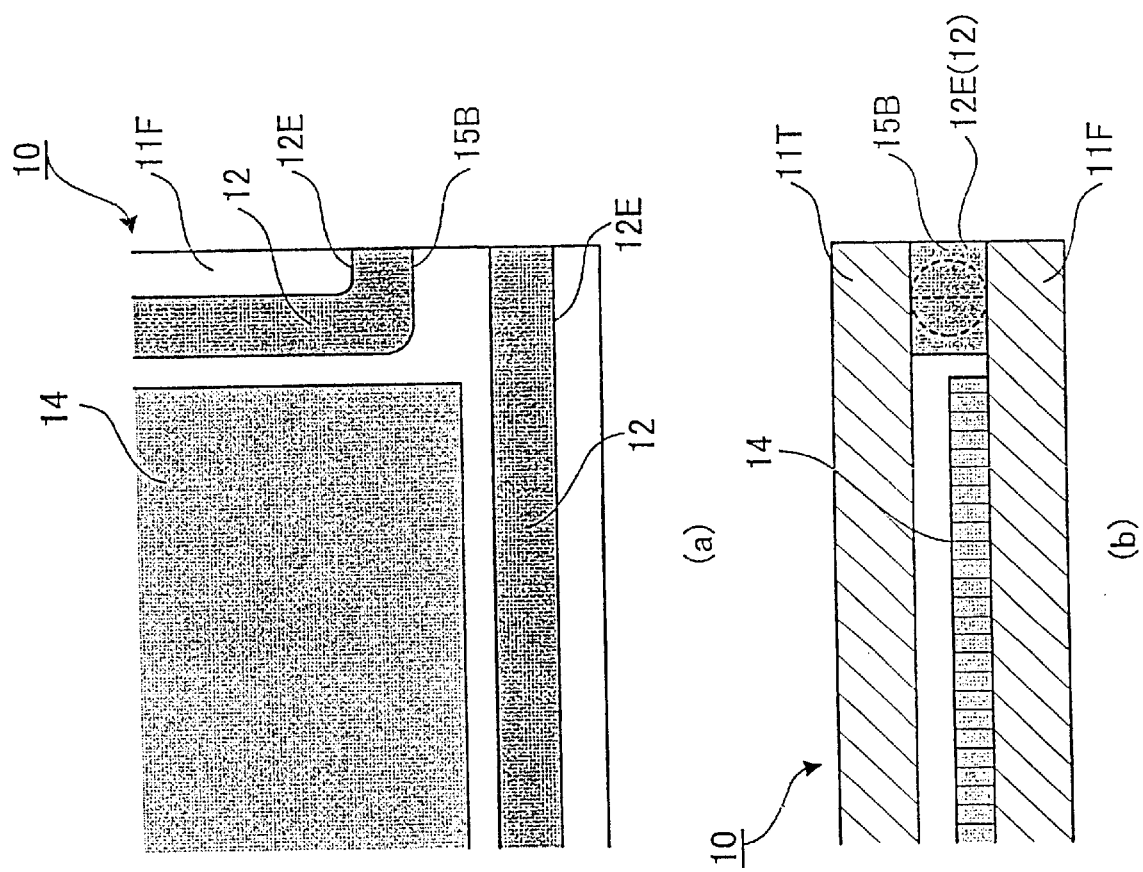
FIGS. 6(a) and 6(b) are views, each showing another example of an outlet.
Figure 7:
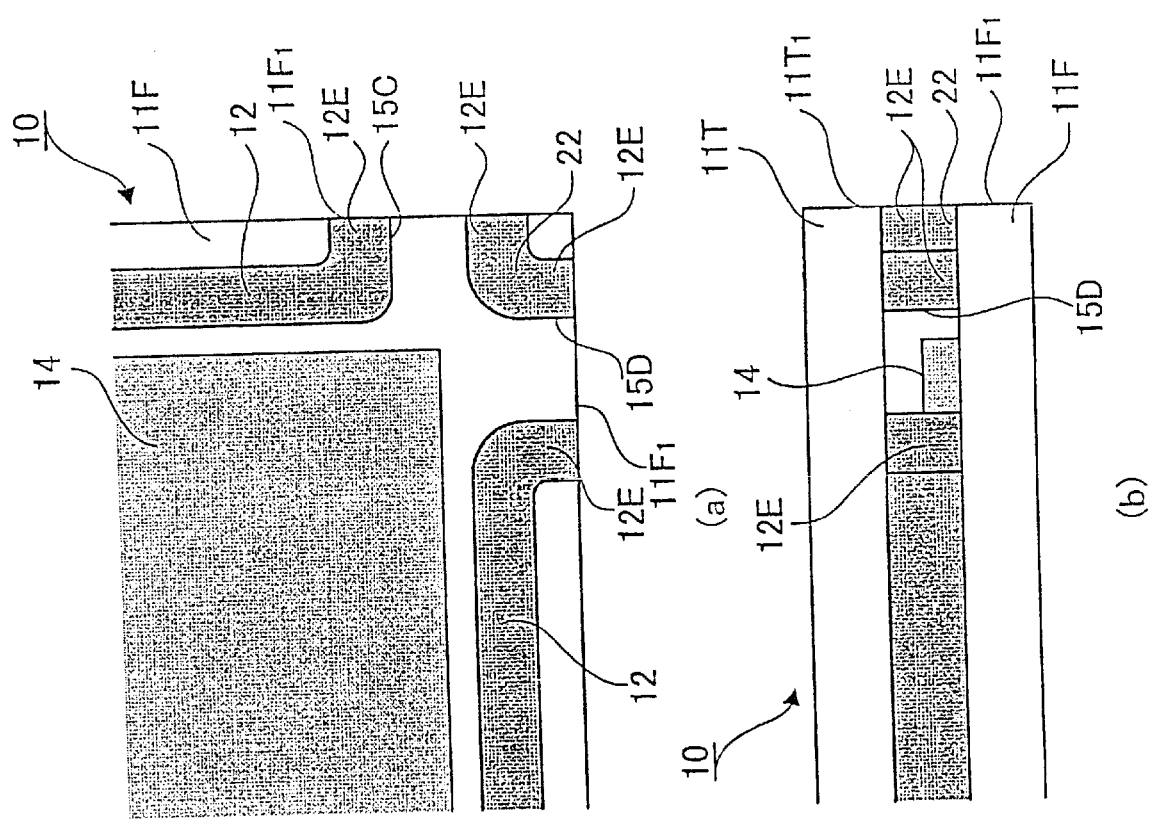
FIGS. 7(a) and 7(b) are views, each showing still another example of the outlet.

Each of FIGS. 5(a) to 5(c) is a view showing a structure of the replenishing port 16A. Specifically, FIG. 5(a) is a front view; FIG. 5(b) is a sectional view taken along a line C—C of FIG. 5(a); and FIG. 5(c) is a sectional view taken along a line D—D of FIG. 5(a). As shown in the drawings, the replenishing port 16A is formed in such a manner that four sides threreof are surrounded by the sealing portions 12 on both sides thereof and the substrates 11T and 11F. In this case, the color filter 14 positioned inside the sealing portion 12 has an introduction spacer (introduction portion) 18 formed in the portion of the replenishing port 16A. This introduction spacer 18 has a thickness substantially equal to that of the color filter 14, and accordingly the surfaces of the introduction spacer 18 and the color filter 14 are set to be continues on the same plane. In other words, a gap g3 in the replenishing port 16A is set substantially equal to a region surrounded by the sealing portions 12, that is, the gap 1 between the substrate 11T (electrode surface thereof) and the color filter 14 (electrode surface thereof) of the substrate 11F. In addition, the introduction spacer 18 protruding to the replenishing port 16A side is constituted such that both sides of its tip portion 18a can be formed to be superposed on the sealing portions 12. Accordingly, the introduction spacer 18 is provided in the entire region in a width direction of the replenishing port 16A.

For the introduction spacer 18, a material different from that for the color filter 14 may be used. A dummy color filter may be formed by using the same material as that for the color filter 14, and used as the introduction spacer 18. When a black matrix (not shown) is formed around the color filter 14, the introduction spacer 18 can be made of the same material as that for this black matrix. Note that, when the black matrix is made of an organic material such as black color resist and color resist of the same material as that for the color filter 14 [optimal is B (Blue), followed by R and G in this order], this black matrix can be directly used as the introduction spacer 18. On the other hand, when the black matrix is made of an inorganic material such as chromium, since it is difficult to secure a thickness (1 to 2 micrometer) equal to that of the color filter 14 by chromium sputtering, a dummy color filter must be separately formed to be superposed on the black matrix layer.

Thus by providing the introduction spacer 18 in the replenishing port 16A, the substantial opening of the replenishing port 16A is the portion surrounded by the sealing portions 12 on both sides, the introduction spacer 18 and the substrate 11T.

If the introduction spacer 18 is not provided in the replenishing port 16A, a step is present more inside than the replenishing port 16A by the color filter 14. Then, when the liquid crystal 13 for replenishment is supplied to the replenishing port 16A as described later, the introduction of the liquid crystal for replenishment into the liquid crystal cell 10 is surrounded by the step by the color filer 14. On the other hand, if the introduction spacer 18 having a height equal to that of the color filter 14 is provided in the replenishing port 16A, the liquid crystal 13 for replenishment can be smoothly introduced into the liquid crystal cell 10 by a capillary phenomenon (capillarity)

Next, description will be made for the step of injecting the liquid crystal 13 when the liquid crystal cell 10 having the foregoing structure is fabricated.

In the case of using the dropping method for injecting the liquid crystal 13 into the liquid crystal cell 10, first, a sealant for forming the sealing portion 12 is coated on a predetermined position of the substrate 11F on which the color filter 14 is provided. Then, the predetermined amount of liquid crystal 13 is dropped by a dispenser inside the sealing portion 12 of the substrate 11F. Then the dropped liquid crystal 13 is leveled on the color filter 14 because of its own surface tension, and spread on the entire region of the portion surrounded by the sealing portion 12. Subsequently, by sticking the substrate 11T having the TFT formed thereon to the substrate 11F, a configuration of the liquid crystal cell 10 can be obtained. In this state, the sealing portion 12 is not yet cured.

Subsequently, a bubble pushing-out process is executed for the liquid crystal cell 10. As shown in FIG. 2, the liquid crystal cell 10 mounted on the conveyor C is pressed from upper and lower sides by pressure rollers 20U and 20L while being conveyed in an arrow direction shown in the drawing. In this case, a pressing force applied by the pressure rollers 20U and 20L or an interval therebetween is previously set so that the gap g1 (see FIG. 4(c)) may become equal to a predetermined dimension.

Accordingly, when the liquid crystal cell 10 is pressed from both sides by the pressure rollers 20U and 20L, with the places pressed by the pressure rollers 20U and 20L as a center, the substrates 11T and 11F are brought close to each other while the uncured sealing portion 12 being elastically deformed. The pressed places are sequentially moved (direction reverse to the arrow direction in the drawing) accompanied with the conveying of the liquid crystal cell 10 by the conveyor C. As a result, the superfluous liquid crystal 13 in the liquid crystal cell 10 and bubbles mixed in the liquid crystal 13 are pushed out through the two outlets 15A. In this case, the bubbles pushed out with the liquid crystal 13 can be trapped in the space of the outlet 15A by the step 17, and the returning of the bubbles into the liquid crystal cell 10 can be prevented. Moreover, in the outlet 15A, the space for trapping the bubbles is secured to a maximum limit by the extended sealing portions 12, as described above, extended to the outer peripheral end surfaces $11T_1$ and $11F_1$ of the substrates 11T and 11F.

Efficiency is provided by carrying out the foregoing bubble pushing-out process simultaneously with the gap adjustment of the substrates 11T and 11F of the liquid crystal cell 10. Specifically, in the liquid crystal cell 10, the gap g1 is set equal to, for example, around 10 micrometer in a state where the substrates 11T and 11F are simply stuck together. To adjust this gap g1 to a predetermined value (for example, 5 micrometer), the liquid crystal cell 10 is pressed by the pressure rollers 20U and 20L.

In this case, if the gap g1 is narrowed gradually at a plurality of stages, plural groups of pressure rollers 20U and 20L may be provided, and the pushing-out and gap adjustment processes may be carried out plural number of times.

To carry out the bubble pushing-out process, it may be effective to heat the liquid crystal 13. The heating of the liquid crystal 13 results in the softening of the sealant of the sealing portion 12 and the better fluidity of the liquid crystal 13, which makes it possible to quickly push out bubbles. Moreover, if the gap adjustment is carried out simultaneously with the pushing-out process, the gap adjustment can be also executed more quickly because of easier breaking of the sealing portion 12. In this case, if a thermosetting material is used for the sealant of the sealing portion 12, needless to say, heating should be limited to a temperature within a range, where curing reaction does not start in the sealant.

The bubble pushing-out process may cause the shortage of the liquid crystal 13 inside the liquid crystal cell 10. Thus, a replenishing process of the liquid crystal 13 should be carried out successively.

The replenishing process of the liquid crystal 13 is carried out by supplying the predetermined amount of liquid crystal 13, by a dispenser not shown, to the portion of the replenishing port 16A bored in both sides of the liquid crystal cell 10. The supplied liquid crystal 13 is adhered to the side of the liquid crystal cell 10 by its surface tension. By the capillary phenomenon (capillarity), the adhered liquid crystal 13 is smoothly introduced into the liquid crystal cell 10, and then replenishment is carried out.

After replenishment of the liquid crystal 13 is carried out in such a manner, a sealing agent (not shown) is coated on the outlet 15A and the replenishing port 16A. For such a sealing agent, a material selected from a silicon resin, an ultraviolet-curing resin, an epoxy resin, an acrylic resin, and the like may be used.

Subsequently, in order to cure the sealant or sealing agent of the sealing portion 12, heat is applied by low-temperature burning if a thermosetting material is used. Irradiation with ultraviolet rays is executed if an ultraviolet-curing material is used. Then, when the curing of the sealant or the sealing agent is finished, the liquid crystal cell 10 is completed.

As described above, the bubbles mixed in the liquid crystal 13 injected into the liquid crystal cell 10 can be pushed out by the pressure rollers 20U and 20L. In this case, the step 17 is formed with the color filter 14 in the outlet 15A having the space secured to a maximum limit by the extended sealing portions 12 extended to the outer peripheral end surfaces $11T_1$ and $11F_1$ of the substrates 11T and 11F. Accordingly, the pushed-out bubbles can be surely trapped in the space of the outlet 15A, and the returning of the bubbles into the liquid crystal cell 10 can be prevented. As a result, it is possible to suppress the generation of defectives.

In addition, the liquid crystal 13 can be replenished through the replenishing port 16A even when the removal of bubbles causes the shortage of the liquid crystal 13 in the liquid crystal cell 10. Moreover, since the introduction spacer 18 having the height equal to that of the color filter 14 is provided in this replenishing port 16A, the liquid crystal 13 for replenishment can be smoothly introduced into the liquid crystal cell 10 by a capillary phenomenon.

Further, according to the foregoing method, since the bubble pushing-out process can be carried out while the liquid crystal cell 10 being conveyed by the conveyor C, the liquid crystal cell 10 can be produced not by a batch process but by a single wafer process (so-called a continuous production process in a production line). Accordingly, the method of the described embodiment is effective, particularly when the liquid crystal 13 is injected by the dropping method as described above, and the liquid crystal cell 10 can be produced with high production efficiency. Moreover, the application of the dropping method enables not only a glass substrate but also a resin substrate to be used for the substrates 11T and 11F.

In addition, in the foregoing liquid crystal cell 10, the outlet 15A and the replenishing port 16A are provided, with respect to the conveying direction by the conveyor C, on both sides thereof. Accordingly, even when the liquid crystal 13 pushed out from the outlet 15A or supplied to the replenishing port 16A is dropped downward, adhesion thereof to the conveyor C, a mechanism for driving the conveyor C, or the like can be prevented. For the pressure rollers 20U and 20L, at least brackets for holding the pressure rollers 20U and 20L rotatably, and moreover a mechanism for driving the pressure rollers 20U and 20L are provided. Such brackets and a mechanism are highly probably provided above the liquid crystal cell 10 to be conveyed by the conveyor C. In order to prevent interference with these components, it may be effective to provide the outlet 15A and the replenishing port 16A on both sides in the conveying direction of the conveyor C.

Note that, the structures, disposition and the like of the outlet 15A and the replenishing port 16A are not limited to the foregoing embodiment. Other examples of the outlet 15A and the replenishing port 16A are described below. Similar components as those described above are denoted by the same reference numerals, and explanation thereof will be omitted.

FIGS. 6(a) and 6(b) to FIG. 10 show other examples of the outlet 15A.

An outlet 15B (first opening, opening portion) shown in each of FIGS. 6(a) and 6(b) has an opening direction changed from that shown in each of FIGS. 4(a) to 4(c). Specifically, the outlet 15B is provided to be bored in the side face in the short direction of the liquid crystal cell 10. In this case, the replenishing port 16A shown in each of FIGS. 4(a) to 4(c) and the outlet 15B shown in each of FIGS. 6(a) and 6(b) are positioned in side faces adjacent to each other in the liquid crystal cell 10.

FIGS. 7(a) and 7(b) show outlets (first opening, opening portion) 15C and 15D, which are bored in two side faces adjacent to each other in the liquid crystal cell 10. In this case, at the corner portion of the liquid crystal cell 10, a corner sealing portion 22 is provided in a position intersected by the extension lines of two sealing portions 12 extended along the two side faces adjacent to each other. As in the case of the sealing portion 12, in the corner sealing portion 22, extended sealing portions 12E are formed to reach the outer peripheral end surfaces $11T_1$ and $11F_1$ of the substrates 11T and 11F.

Figure 8:
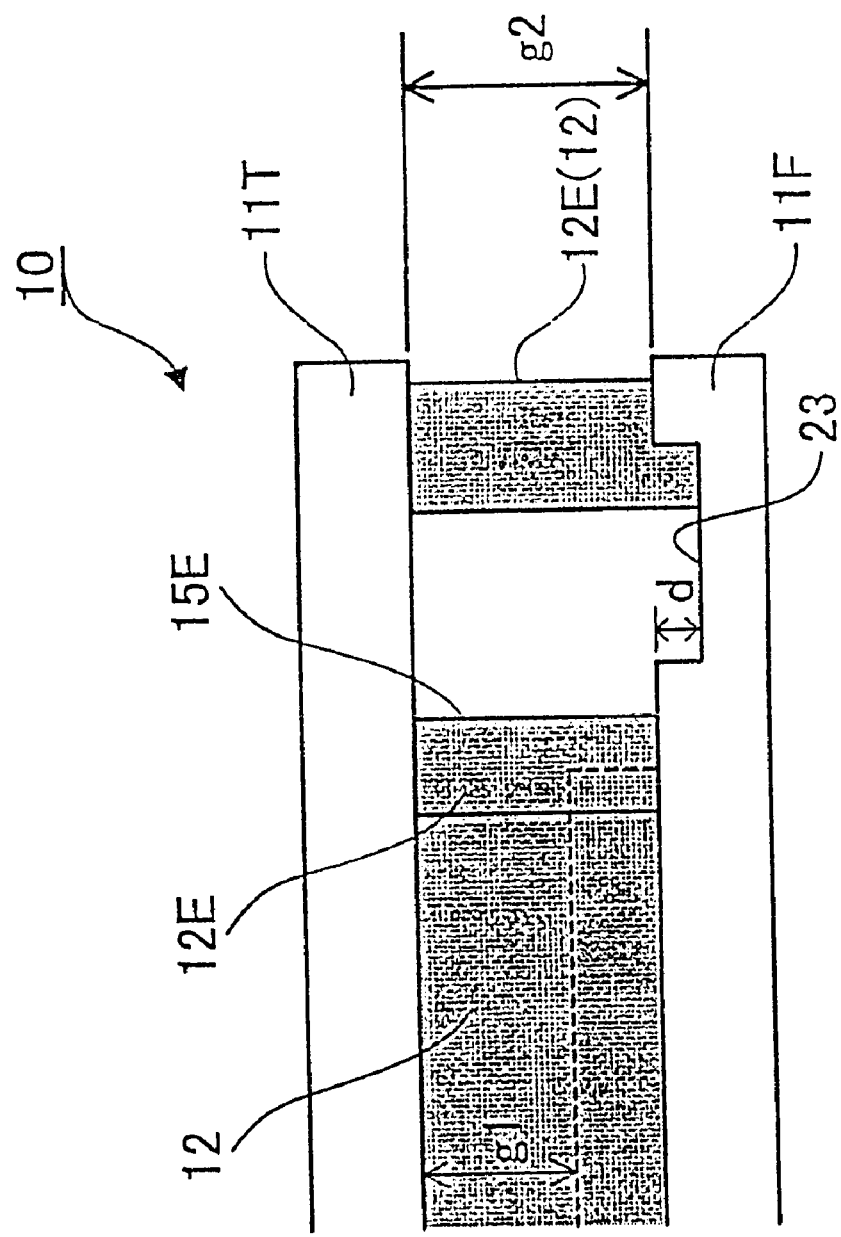
FIG. 8 is a view showing still another example of the outlet.

FIG. 8 shows an outlet (first opening, opening portion) 15E, which includes a recessed portion 23 formed as bubble trapping means on the substrate 11F for forming a bottom surface of a space. This recessed portion 23 can have a depth of, for example, d=20 micrometer, considering the thickness of the substrate 11F, and have a dimension larger than the gap g1 (6 to 7 micrometer) between the substrates 11T and 11F. Accordingly, a substantial capacity of the space of the outlet 15E can be greatly increased, compared with that shown in each of FIGS. 4(a) to 4(c), and the amount of bubbles to be trapped can be increased. Note that the recessed portion 23 can be formed by, for example conducting a blasting process with particulate sand or glass beads to the substrate 11F.

Such a recessed portion 23 can be also formed in each of the outlets 15A, 15B, 15C, 15D shown in FIGS. 4(a) to 4(c), FIGS. 6(a) and 6(b), and FIGS. 7(a) and 7(b).

Figure 9:
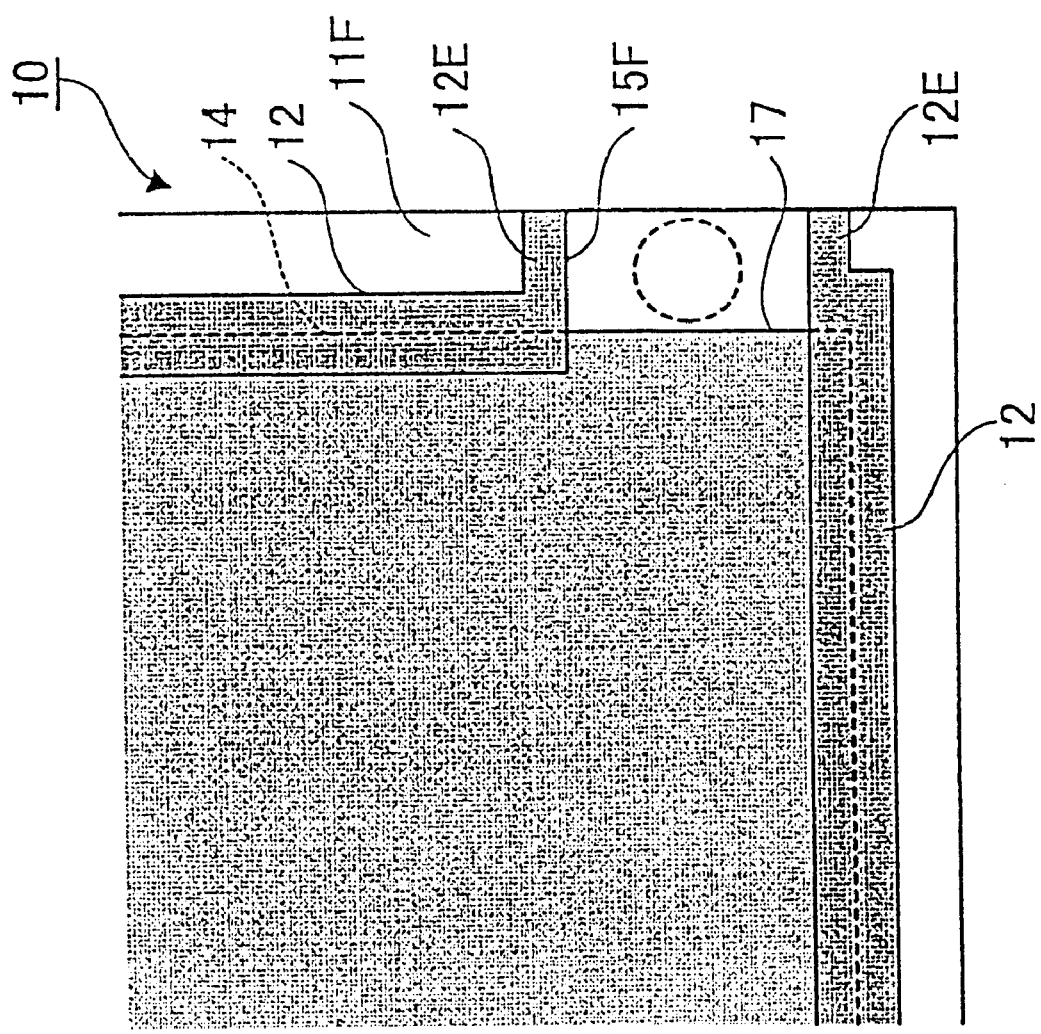
FIG. 9 is a view showing still another example of the outlet.

FIG. 9 shows the color filter 14, which has an end portion 14a superposed on the sealing portion 12. In such a constitution, the step 17 with the color filter 14 is formed only in the portion of an outlet (first opening, opening portion) 15F.

Figure 10:
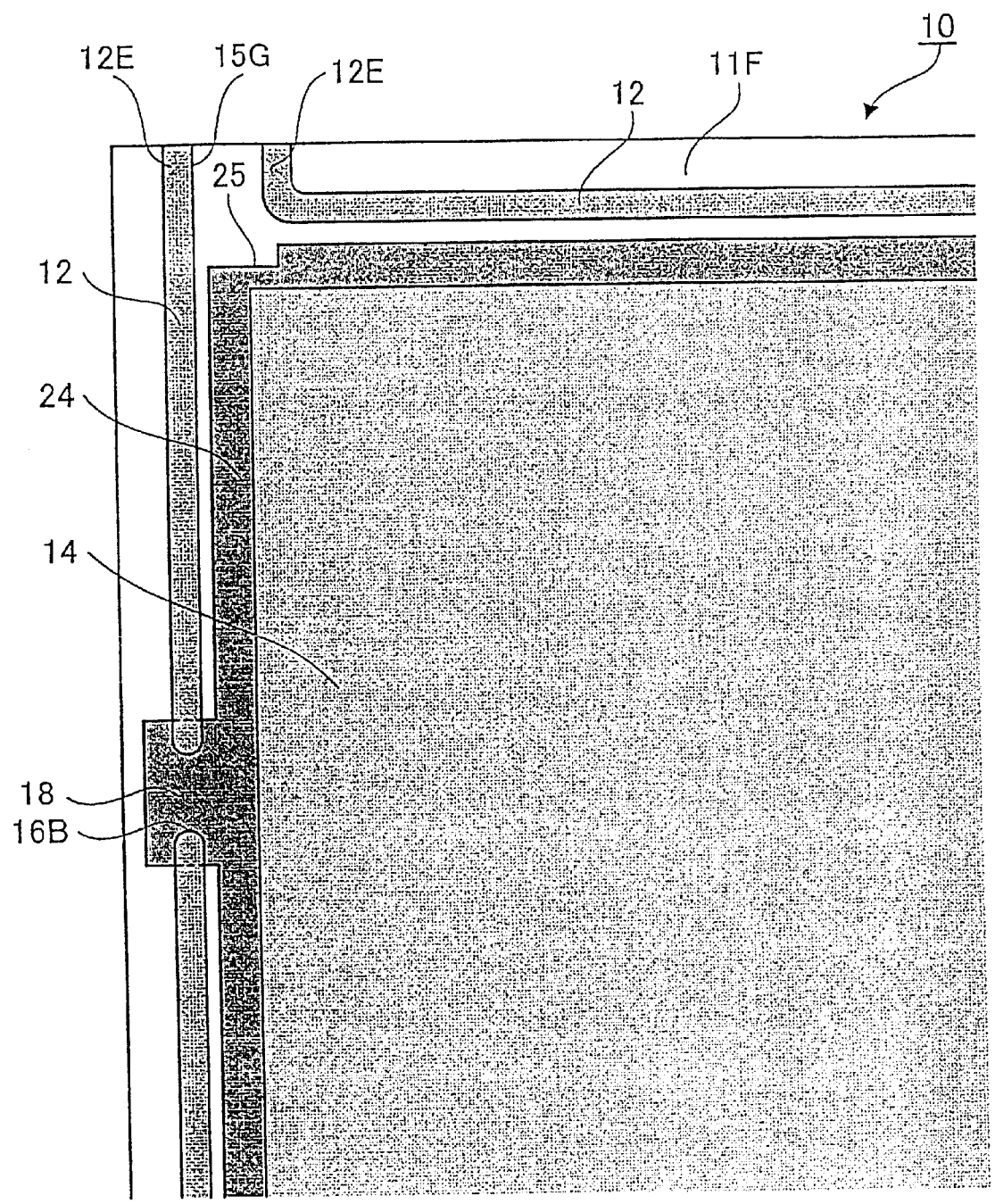
FIG. 10 is a view showing another example of the outlet and the replenishing port.

FIG. 10 also shows the color filter 14, which has a dummy color filter 24 formed in an outer peripheral portion thereof and has a notch 25 formed in the dummy filter 24 in a position corresponding to an outlet (first opening, opening portion) 15G. The formation of such a notch 25 enables the substantial capacity of the space of the outlet 15G to be increased.

Next, other examples of the replenishing port 16A will be described.

In a replenishing port (second opening) 16B shown in FIG. 10, an introduction spacer 18 is formed by the dummy color filter 24, and this introduction spacer 18 is protruded outside more than the sealing portion 12. In this case, for the dummy color filter 24, as described above, the same material as that of the color filter 14, the same material as that of the black matrix (not shown) around the color filter 14, or the like, can be used.

In such a replenishing port 16B, when the liquid crystal for replenishment is supplied to the side face of the liquid crystal cell 10, by the introduction spacer 18 protruded outside more than the sealing portion 12, its introduction into the liquid crystal 13 a the capillary phenomenon can be carried out more effectively than that in the constitution shown in FIGS. 5(a) to 5(c).

Figure 11:
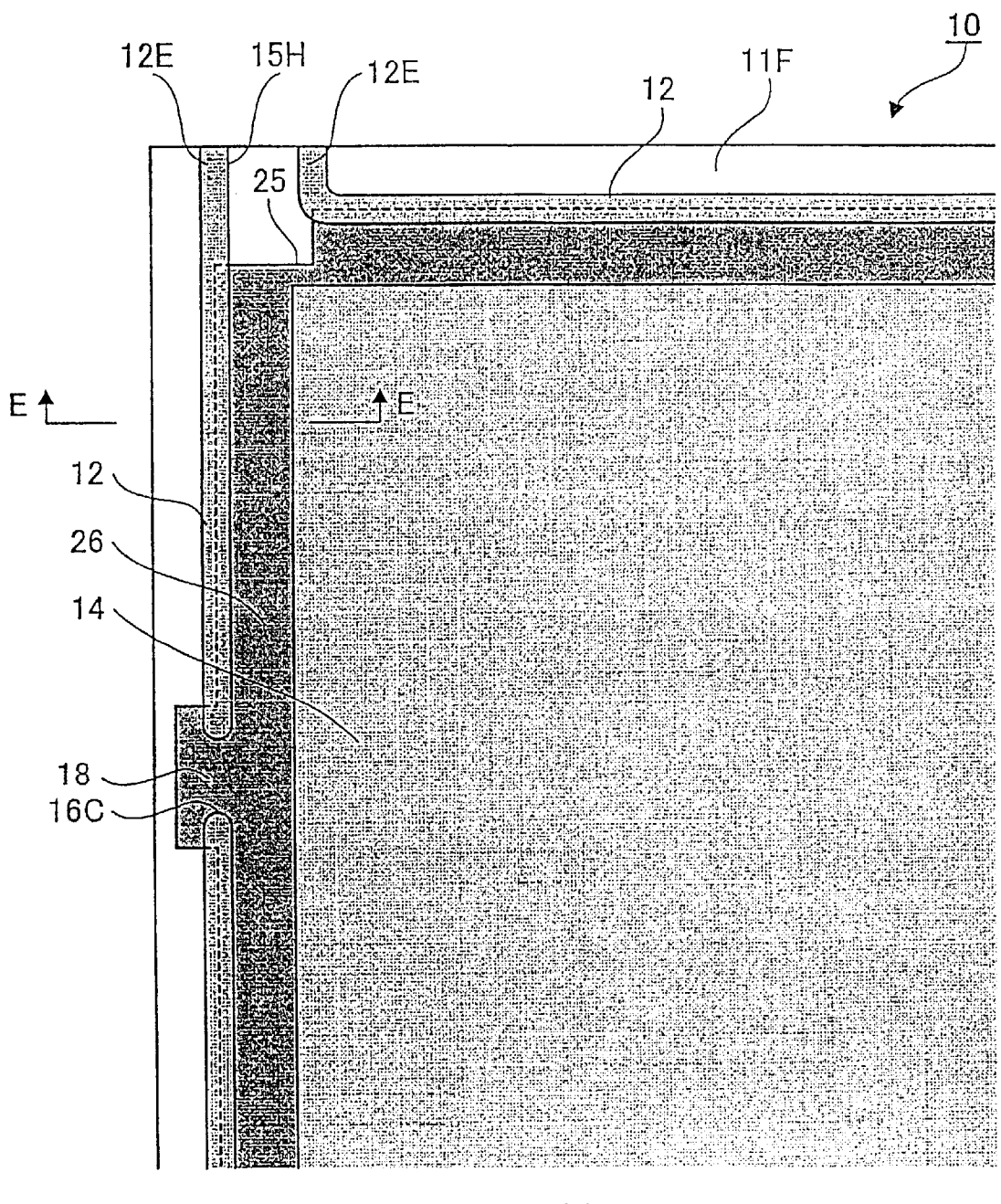
FIGS. 11(a) and 11(b) are views, each showing still another example of the replenishing port.
Figure 11:
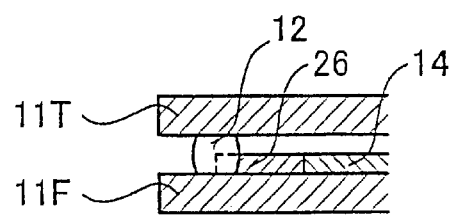

FIG. 11(a) shows a dummy color filter 26 provided to be superposed on the sealing portion 12, and FIG. 11(b) is a sectional view taken along a line E—E of FIG. 11(a). Also, in this case, for the dummy color filter 26, the same material as that of the color filter 14, the same material as that of the black matrix (not shown) around the color filter 14, or the like, can be used. Then, as in the case shown in FIG. 10, in the portion of an outlet (first opening, opening portion) 15H, a notch 25 is formed in the dummy color filter 26. In the portion of a replenishing port (second opening) 16C, the introduction spacer 18 is protruded outside more than the sealing portion 12.

Figure 12:
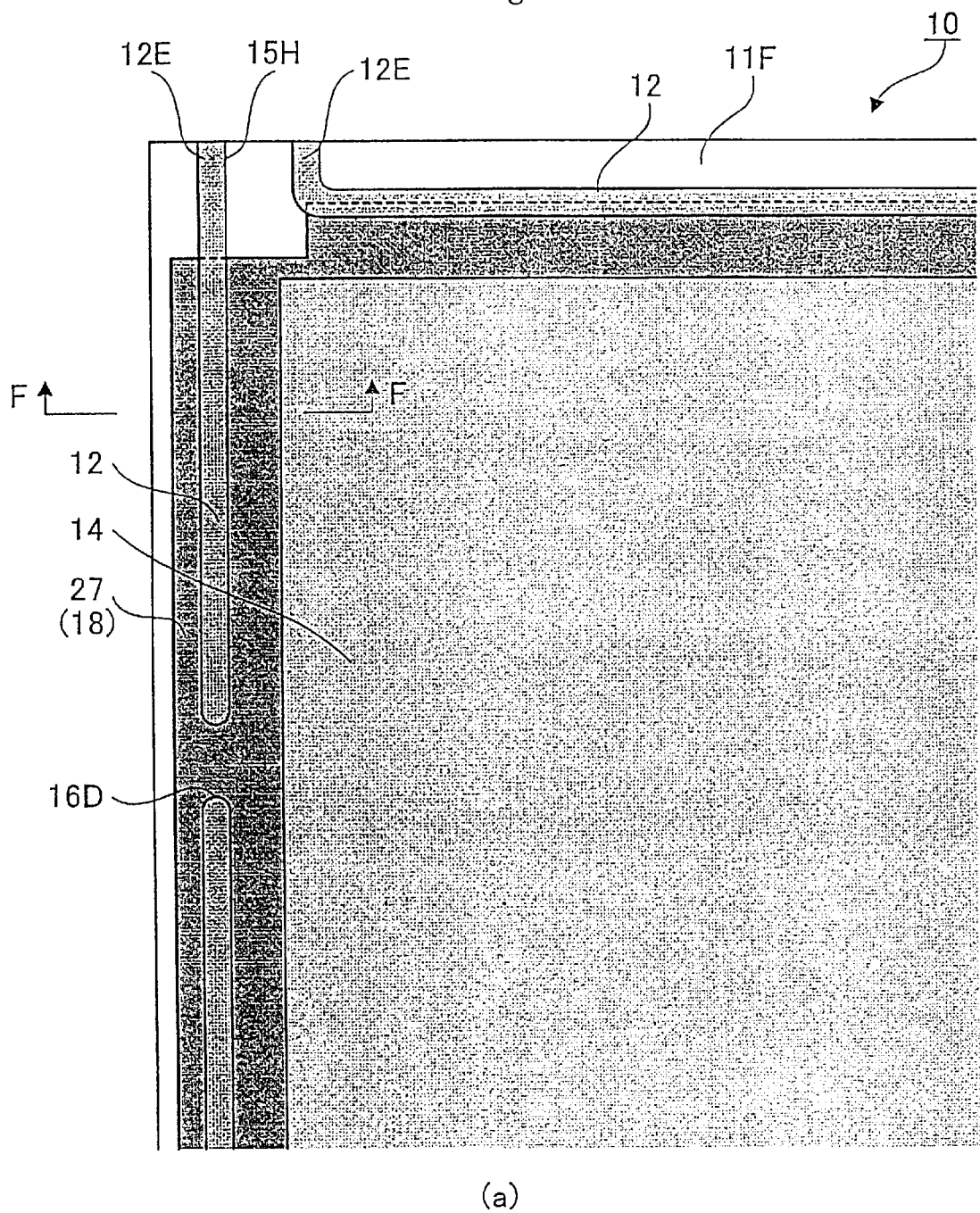
FIGS. 12(a) and 12(b) are views, each showing still another example of the replenishing port.
Figure 12:
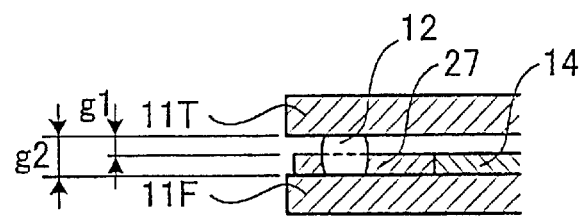

FIG. 12(a) shows a dummy color filter 27 provided not only in the portion of a replenishing port (second opening) 16D but also in the substantially entire region of the side face of the liquid crystal cell 10 having this replenishing port 16D formed therein. FIG. 12(b) is a sectional view taken along a line F—F of FIG. 12(a). As shown in the drawing, as an introduction spacer 18, the dummy color filter 27 is protruded outside more than the sealing portion 12 by a predetermined dimension. Accordingly, in the substantially entire region of the side face of the liquid crystal cell 10, the gap g1 narrower than the gap g2 between the substrates 11T and 11F is present. According to such a constitution, when the liquid crystal 13 for replenishment is supplied to the side face of the liquid crystal cell 10, by the introduction spacer 18 protruded outside more than the sealing portion 12 in the substantially entire region of the side face, the liquid crystal 13 can be introduced to the replenishing port 16D by a capillary phenomenon, which makes it possible to introduce the liquid crystal 13 to the inside of the liquid crystal cell more effectively.

In any of the foregoing examples, pressing is carried out in one direction (direction opposite the arrow in FIG. 2) by the pressure rollers 20U and 20L with respect to the liquid crystal cell 10 conveyed on the conveyor C in the arrow direction of FIG. 2. Needless to say, the present invention is not limited to such a constitution. For example, two pairs of pressure rollers 20U and 20L may be provided and pressing may be carried out from the center portion of the liquid crystal cell 10 toward the both end portions. In this case, the outlets 15A to 15H are formed near both end portions of the liquid crystal cell 10 in a longitudinal direction.

The pair of upper and lower pressure rollers 20U and 20L are used as described above. However, only an upper pressure roller may be provided as long as the liquid crystal cell 10 can be surely held at the conveyor C side for conveying the liquid crystal cell 10 (for example, the liquid crystal cell 10 is placed on a surface plate).

Pressing is carried out by the pressure rollers 20U and 20L while the liquid crystal cell 10 side being moved by the conveyor C. However, needless to say, pressing may be carried out by moving the pressure rollers 20U and 20L sides along the surface of the liquid crystal cell 10. Such a constitution enables pressing to be carried out plural number of times at, for example one place.

In addition, needless to say, pressing means is not limited to the pressure rollers 20U and 20L, and other members can be properly used, as long as bubbles can be pushed out from the liquid crystal 13 of the liquid crystal cell 10.

Further, the moving direction of the pressing place of the liquid crystal cell 10 by the pressure rollers 20U and 20L is not limited to a direction as indicated above. In the described embodiment, the pressing place by the pressure rollers 20U and 20L is moved in the longitudinal direction of the liquid crystal cell 10. However, this moving direction may easily be changed, for example in the short side direction of the liquid crystal cell 10.

Figure 13:
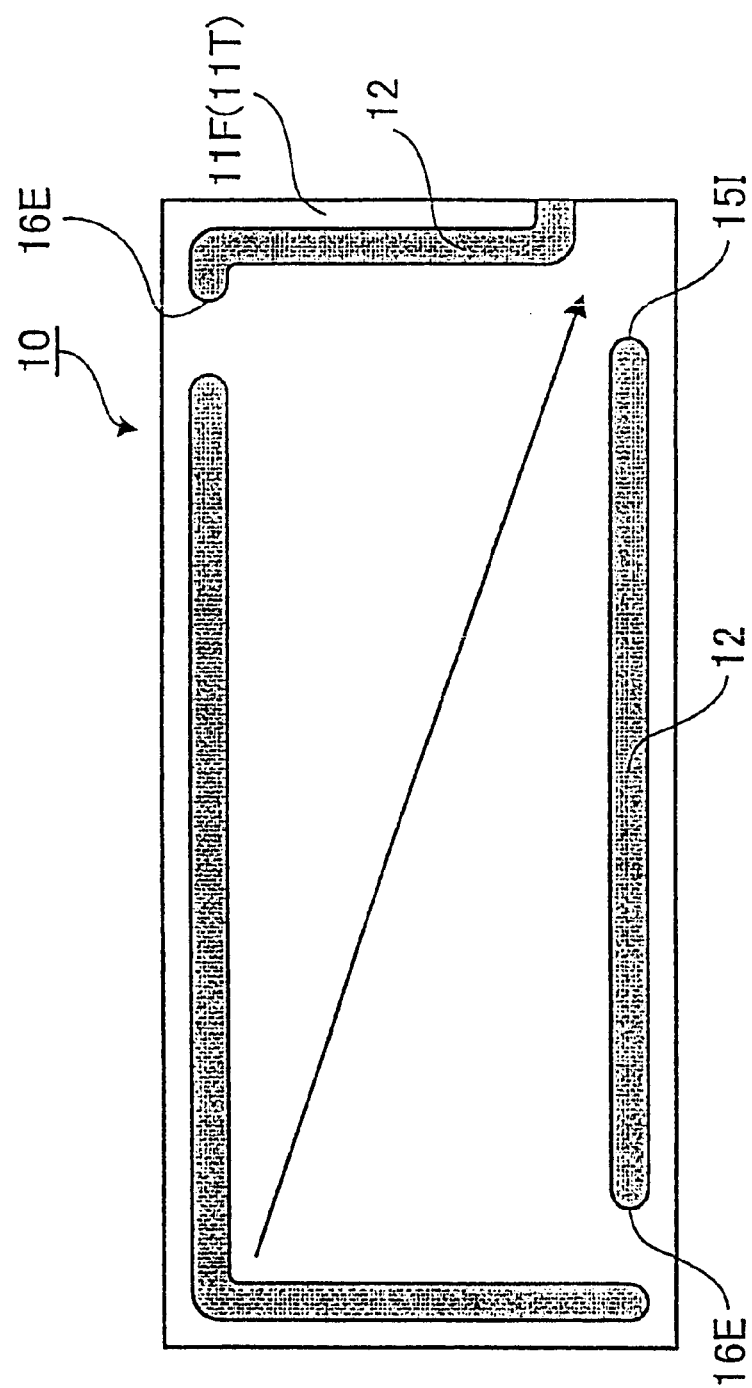
FIG. 13 is a view showing an example where a bubble pushing-out direction is set in another direction.

In addition, as shown in FIG. 13, the pressing place by the rollers can be moved in an oblique direction (see an arrow in the drawing) with respect to the liquid crystal cell 10. In particular, in the liquid crystal cell 10, in order to control the arrangement or inclination of liquid crystal molecules, orientation films (not shown) are formed on both of the substrate 11T of the TFT side and the substrate 11F of the color filter side. Regarding such an orientation film, rubbing process is performed to orient polyimide molecules for forming the orientation film in a predetermined direction. Typically, a rubbing direction is set to be oblique to the liquid crystal cell 10. Accordingly, the pressing direction of the liquid crystal cell 10 by the pressure rollers 20U and 20L (see to FIG. 2) can be matched with the rubbing direction (arrow direction in FIG. 13) of the orientation film of the substrate 11T or 11F. Correspondingly, an outlet (first opening, opening portion) 15I may be provided near the corner of the liquid crystal cell 10 as a downstream side of the pressing direction, and a replenishing port (second opening) 16E may be provided in positions on both sides of the pressing direction. Such a constitution enables a fine groove (line) to be formed on the orientation film by rubbing, and thus bubbles can be smoothly pushed out.

In this case, when the substrate 11T of the TFT side is compared with the substrate 11F of the color filter 14 side, the step is formed on the surface of the substrate of the TFT side because of the wiring portion. Thus, the bubble pushing-out process should preferably be carried out in matching with the rubbing direction of the substrate 11T of the TFT side.

Various outlets 15A to 15I and replenishing ports 16A to 16E were described above, and these components can be appropriately used in combination. There are no limitations on the installing places or the numbers of these outlets 15A to 15I and replenishing ports 16A to 16E. For example, in the described embodiment, the outlets 15A to 15I are all provided near the corner of the liquid crystal cell 10. However, the outlets can be provided in the center portion or the like of the side face of the liquid crystal cell 10. Similarly, the replenishing ports 16A to 16E are provided in the center portion of the side face of the liquid crystal cell 10. However, the replenishing ports can be provided near the corner of the liquid crystal cell 10.

With regard to carrying out the bubble pushing-out process, the liquid crystal 13 and bubbles may be discharged not only through the outlets 15A to 15I but also through the replenishing ports 16A to 16E.

According to the embodiment, the liquid crystal 13 is replenished after carrying out the bubble pushing-out process. However, if the bubble pushing-out process does not cause any shortage of the liquid crystal 13 inside the liquid crystal cell 10, the replenishing process of the liquid crystal 13 can be omitted. In such a case, needless to say, the replenishing ports 16A to 16E can be also omitted.

Further, with regard to the fabricating of the liquid crystal cell 10 described above with reference to the embodiment, the contents of each step or the sequence of steps can be appropriately changed. For example, if the liquid crystal 13 injected from each of the replenishing ports 16A to 16E is surely spread to the entire pixel region inside the liquid crystal cell 10 by a capillary phenomenon, then the injection of the liquid crystal 13 may be carried out after the curing process of the sealant which constitutes the sealing portion 12 is carried out.

In addition, in the embodiment, the bubble pushing-out process is carried out for the liquid crystal cell 10, in which the liquid crystal 13 is injected by the dropping method. However, the present invention is not limited to the dropping method. For example, similarly to the above, the bubble pushing-out process can be carried out for the liquid crystal cell, in which the liquid crystal 13 is injected by a vacuum injecting method. In such a case, however, when the vacuum injection of the liquid crystal 13 is carried out, both of the outlets 15A to 15I and the replenishing ports 16A to 16E formed in the liquid crystal cell 10 must all be dipped in liquid crystal in the vessel. Thus, the vacuum injecting method is not so practical.

As described above, according to the present invention, the injection of liquid crystal into a liquid crystal cell can be carried out efficiently and surely. Moreover, even when bubbles are mixed in the injected liquid crystal, the bubbles can be surely removed, and thereby a high-quality liquid crystal cell can be provided.

Although the preferred embodiment of the present invention has been described in detail, it should be understood that various changes, substitutions and alternations can be made therein without departing from spirit and scope of the inventions as defined by the appended claims.

What is claimed is:

1. A liquid crystal cell, in which two substrates are united with a sealing portion extended in a peripheral direction thereof interposed therebetween, and liquid crystal is filled in a space surrounded by the two substrates and the sealing portion, wherein first and second openings communicating with the space filled with the liquid crystal are formed on at least one side face of the liquid crystal cell, the first opening has a step portion formed by an end portion of a color filter positioned within an outer boundary of the sealing portion with a region adjacent to the step portion surrounded by the sealing portion, and a first gap positioned adjacent to the step portion formed between the two substrates in the region surrounded by the sealing portion, and the second opening has a second gap substantially equal to the first gap between the two substrates in the region surrounded by the sealing portion.

2. The liquid crystal cell according to claim 1, wherein the first and second openings are disposed in two side faces of the liquid crystal cell adjacent to each other.

3. The liquid crystal cell according to claim 1, wherein the first and second openings are disposed in a corner portion of the liquid crystal cell and in a middle portion of a side face in contact with the corner portion to be separated from each other.

4. A display device comprising:

a liquid crystal cell including liquid crystal filled between two substrates and a color filter provided in any one of the substrates; and a backlight unit provided in a backside of the liquid crystal cell to irradiate the liquid crystal cell, wherein the liquid crystal cell includes;

an outlet for discharging bubbles from the liquid crystal in the liquid crystal cell, and a replenishing port in a side face of the liquid crystal cell for replenishing the liquid crystal cell with liquid crystal by use of a capillary phenomenon, and the replenishing port includes an introduction portion continuous to the color filter, a surface thereof being positioned on the same plane as that of the color filter.

5. The display device according to claim 4, wherein the introduction portion is provided to be protruded outside more than the replenishing port.

6. The display device according to claim 4, wherein the introduction portion is made of the same material as that of the color filter.

7. A liquid crystal cell comprising:

two substrates separated from each other by a predetermined gap;

a sealing portion extended, between the two substrates, along the inside more than an outer peripheral end portion of each of the substrates by a specified dimension, and opened in a peripheral direction of each of the substrates in a predetermined position;

a wall portion formed around an opened portion of the sealing portion to reach the outer peripheral end portion of the substrate from the sealing portion;

an opening defined by the two substrates and a pair of the wall portions;

liquid crystal filled in a region surrounded by the sealing portion between the two substrates, wherein the opening includes bubble trapping means for preventing bubbles mixed in the liquid crystal having entered the opening from the region surrounded by the sealing portion from returning to the region surrounded by the sealing portion; and a replenishing port formed in the sealing portion extending into the predetermined gap between the substrates and including an introduction spacer protruding beyond an outer boundary of the sealing portion by a predetermined distance.

8. The liquid crystal cell according to claim 7, wherein as the bubble trapping means, a step portion is formed in the opening.

9. The liquid crystal cell according to claim 7, wherein as the trapping means, a recessed portion is formed in a portion having the opening formed therein.

10. The liquid crystal cell according to claim 7 further comprising: a dummy color filter formed in an outer peripheral portion of a color filter positioned within the predetermined gap between the substrates.

11. The liquid crystal cell according to claim 10, wherein the opening includes a notch formed in the dummy color filter.

12. The liquid crystal cell according to claim 7 further comprising:

a dummy color filter formed in an outer peripheral portion of a color filter positioned within the predetermined gap between the substrates and superposed on the portion, wherein the introduction spacer of the replenishing portion is continuous to the color filter.

* * * * *